March 1, 1966  E. D. DALL  3,237,907
SEAT TRACK
Filed Feb. 14, 1963
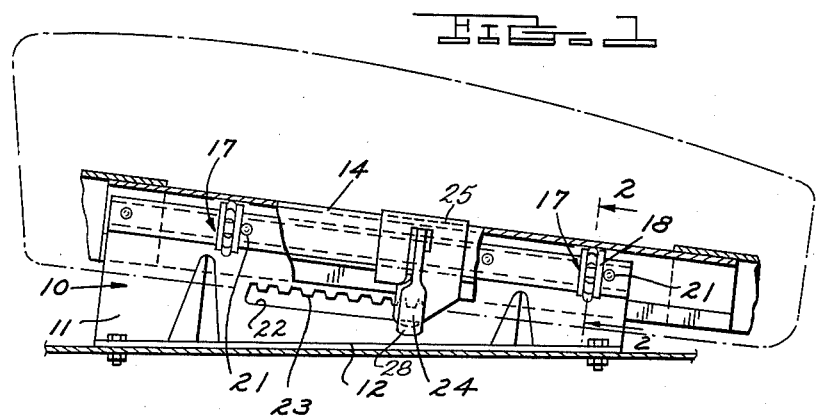
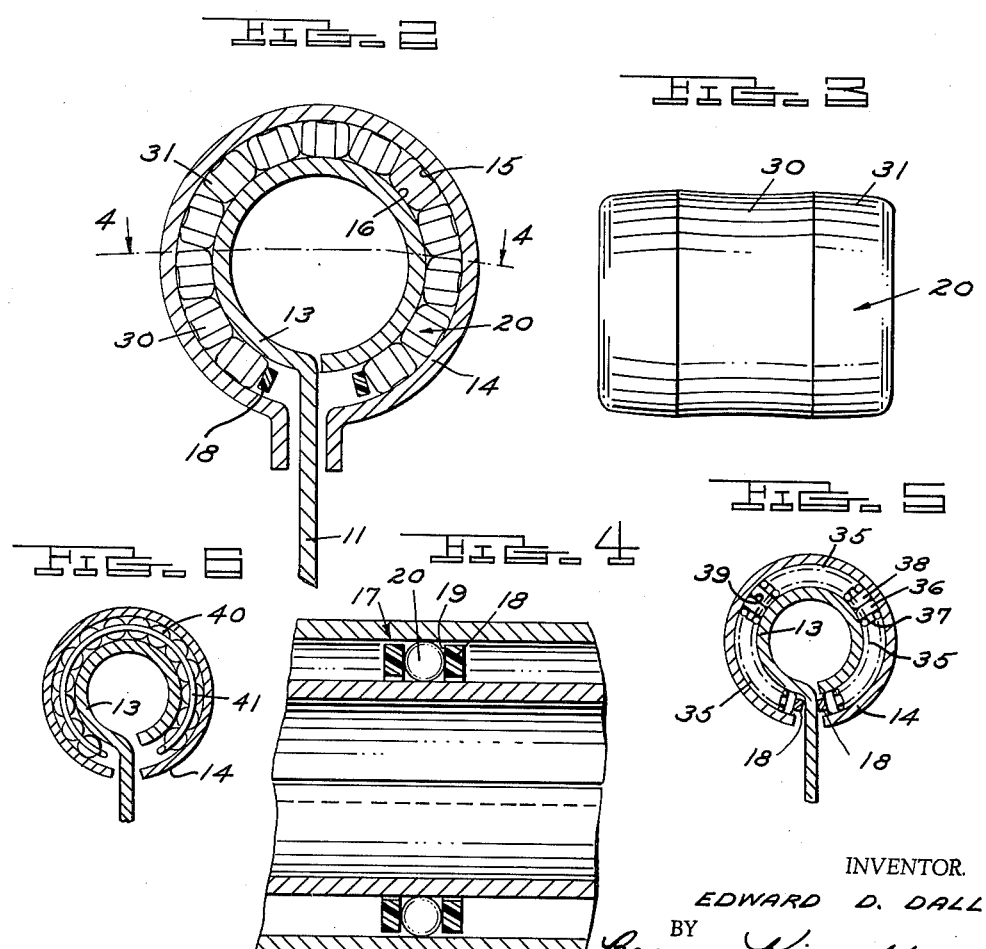
INVENTOR.
EDWARD D. DALL
BY
ATTORNEYS 3,237,907
SEAT TRACK
Edward D. Dall, Birmingham, Mich.; Beatrice L. Dall, administratrix of said Edward D. Dall, deceased
Filed Feb. 14, 1963, Ser. No. 258,406
5 Claims. (Cl. 248—430)

This application is a continuation-in-part of Patent 3,007,668, issued November 7, 1961, and my copending application Serial No. 38,304, filed June 23, 1960, now Patent 3,120,371, issued February 4, 1964.

This invention relates to seat tracks and particularly to seat tracks that are used on automotive vehicles.

There is disclosed and claimed in the abovementioned patents a novel seat track mechanism which comprises a generally tubular support mounted on the floor of a vehicle, a complementary tubular carriage mounted on the seat and having a surface surrounding a portion of the surface of the tubular support, and roller bearing means interposed between the surfaces at longitudinally spaced points. Guide means are movable longitudinally with each roller bearing means independently of the carriage and the support for retaining the roller bearing means in longitudinally spaced relation and relative transverse position with the longitudinal axis of the tubular support. In my patent, the roller bearing means comprise a tightly wound helical wire spring. In my aforementioned Patent 3,120,371, roller bearing means is disclosed which comprises a plurality of discrete contiguous roller members positioned in side-by-side relationship transversely of the axes of the tubular support and carriage.

It is an object of this invention to provide a seat track of the general type shown in my prior patent and patent application utilizing novel bearing means.

In the drawings:

FIG. 1 is a part sectional end elevational view of a seat track embodying the invention.

FIG. 2 is a fragmentary sectional view on an enlarged scale taken along the line 2—2 in FIG. 1.

FIG. 3 is a side view on an enlarged scale of a roller bearing member utilized in the seat track mechanism.

FIG. 4 is a fragmentary sectional view taken along the line 4—4 in FIG. 2.

FIG. 5 is a view similar to FIG. 2 of a modified form of seat track.

FIG. 6 is a view similar to FIGS. 2 and 5 of a further modified form of seat track.

Referring to FIG. 1, a plurality of supports 10, usually two, are adapted to be mounted on the floor of a vehicle. Only one of the supports is shown in the drawings. Each support 10 comprises a single sheet metal member including a vertical panel or web 11 and an inwardly turned flange 12 through which bolts extend to fasten the support 10 to the floor of the vehicle. The upper end of panel 11 is bent to form a tubular support 13 that is adapted to extend longitudinally of the vehicle (FIG. 2). A split tubular member 14 is telescoped over the support 13 providing an inner surface 15 complementary to the exterior surface 16 of support 13.

As shown in FIG. 1, roller bearing assemblies 17 are provided at longitudinally spaced points between surfaces 15, 16 and comprise members 18 which are generally cylindrical with the ends thereof adjacent the panel 11 (FIGS. 2 and 4). Each guide member 18 has a slot 19 therein intermediate its closed ends in which a plurality of discrete contiguous roller members in side-by-side contact are positioned to provide the roller bearing. The arrangement is such that if the carriage 14 is moved longitudinally of the support 13 the roller members 20 roll providing the bearing between the carriage 14 and support 13. Stops 21 are provided at longitudinally spaced points on the carrige 14 to limit the movement of the bearing assemblies 17.

A portion of the panel 11 is cut away centrally thereof as at 22 and the upper edge of the opening is formed with teeth 23 which are adapted to be engaged by a latch 24 to lock the carriage 14 in adjusted position on the support 13. As shown in FIG. 1, latch 24 is pivoted to a U-shaped bracket 25 fixed on the carriage 14 and is yieldingly urged into engagement with the teeth by a tension spring (not shown) that has one end thereof fastened to the latch 24 and the other end thereof fastened to a finger (not shown) struck out from the bracket 25. Latch 24 includes a handle 28 extending laterally outwardly and providing a means for grasping the latch to actuate it.

In practice, a pair of seat track mechanisms are provided for each seat and the latches of the mechanisms are interconnected by a rod or wire so that when one latch is operated, the other is also operated releasing the latches and permitting the seat to be adjusted longitudinally of the vehicle.

Each of the roller members 20 and the guide 18 are made of an organic plastic material which has low friction properties such as nylon, Delrin, or Teflon. As shown in FIG. 3, each roller member 20 preferably comprises an intermediate portion 30 which has an annular surface which is convex in longitudinal section and end portions 31 which have an annular surface which is concave in cross section. The radius of curvature of the convex surface of the intermediate portions 30 is substantially equal to the radius of curvature of the outer surface 16 of the tubular support 13. The radius of curvature of the convex surface of the end portions 31 is preferably substantially equal to the radius of curvature of the inner surface 15 of the tubular carriage 14.

By this arrangement, the seat is supported through the tubular carriage on the tubular support so that it can move smoothly and freely.

In the form of the invention shown in FIG. 5, the roller members comprise tightly wound helical wire springs 35 and solid cylindrical members 36 in the ends of the springs 35. Each member 36 has a reduced end 37 which extends into its respective spring and a cylindrical periphery 38 which engages the inner surface of carriage 14 and the outer surface of support 13. The other end 39 of each cylindrical member 36 is slightly convex. The periphery 38 has a diameter substantially the same as the outer diameter of spring 35.

In the form of the invention shown in FIG. 6, the roller members 40 comprise balls 41 in side-by-side contact in a wire guide member.

It can thus be seen that there has been provided a seat track mechanism utilizing a novel bearing means.

I claim:

1. In a seat track, the combination comprising
   a base adapted to be supported on the floor of a vehicle or the like,
   an upstanding web extending upwardly from said base,
   a substantially seamless imperforate tubular support on the upper end of said web,
   a complementary tubular carriage comprising a split tube adapted to be mounted on the underside of a seat and being telescoped over the tubular support with the longitudinal edges of said split tube adjacent said web,
   the external surface of the support and the internal surface of the carriage being complementary,
   roller bearing means comprising a plurality of discrete contiguous roller members in side-by-side contact interposed between the external surface of said tubular support and the internal surface of said tubular carriage at longitudinally spaced points along said carriage, guide means for each said roller bearing means movable with said roller bearing means independently of said support and said carriage, said guide means comprising a generally cylindrical member having a slot extending transversely therethrough in which said roller members are positioned in contiguous relationship, said cylindrical member having substantial thickness approaching the diameter of said roller members, said cylindrical member being movable transversely of said split tube and said tubular support independently of the roller members, said guide means maintaining said roller bearing means in substantially transverse relation to said support and said carriage.

2. The combination set forth in claim 1 wherein said cylindrical member is made of plastic material having low friction properties.

3. The combination set forth in claim 1 wherein said roller members are generally cylindrical and comprise an intermediate portion and end portions merging with said end portions, each said intermediate portion being generally concave and having a radius of curvature conforming substantially to the radius of curvature of the exterior surface of the tubular support, each said end portion being generally convex and having a radius of curvature substantially equal to the radius of curvature of the interior surface of the tubular support, each said roller member having end surfaces which abut the end surfaces of adjacent roller members.

4. The combination set forth in claim 1 wherein each said roller member comprises a plurality of tightly wound helical springs, a generally cylindrical member in each end of each said spring, each said cylindrical member having a reduced portion extending axially into said spring, each said cylindrical member having a peripheral surface with a diameter substantially equal to the outer diameter of the spring in which it is positioned.

5. The combination set forth in claim 1 wherein said roller members comprise balls in side-by-side contact.

References Cited by the Examiner
UNITED STATES PATENTS

| | | | |
|---|---|---|---|
| 1,877,395 | 9/1932 | Goeser | 308—6 |
| 2,316,468 | 4/1943 | Thomas | 308—6 |
| 2,889,180 | 6/1959 | Jorgensen | 308—6 |
| 2,995,405 | 8/1961 | Ferdig | 308—190 |
| 3,007,668 | 11/1961 | Dall | 248—429 |
| 3,120,371 | 2/1964 | Dall | 248—397 |

CLAUDE A. LE ROY, *Primary Examiner.*

FRANK L. ABBOTT, *Examiner.*